(12) United States Patent
Larsen et al.

(10) Patent No.: US 6,378,361 B1
(45) Date of Patent: Apr. 30, 2002

(54) METHOD AND APPARATUS FOR CREATING A WIND TUNNEL BY REDIRECTING AN AIR FLOW NINETY DEGREES

(75) Inventors: Harold C. Larsen, Dayton, OH (US); Chris J. Landon, Waynesville, NC (US); Ben Stone, Alpha, OH (US)

(73) Assignee: Vertical Wind Tunnel Corporation, Waynesville, NC (US)

(*) Notice: Subject to any disclaimer, the term of this patent is extended or adjusted under 35 U.S.C. 154(b) by 0 days.

(21) Appl. No.: 09/354,823

(22) Filed: Jul. 16, 1999

(51) Int. Cl.[7] .............................................. B21C 47/00
(52) U.S. Cl. ............................................... 73/147
(58) Field of Search ................................ 73/147; 244/6, 244/7 R, 12.1, 12.3, 17.11, 17.25, 17.19, 17.21, 51, 52, 207–209; 472/49–50, 131, 136; 434/34, 252, 258, 247

(56) References Cited

U.S. PATENT DOCUMENTS

| 1,676,984 | A | 7/1928 | Fales et al. |
| 1,811,364 | A | 6/1931 | Olshevsky |
| 1,940,790 | A | 12/1933 | Diehl |
| 2,382,999 | A | 8/1945 | Lee |
| 2,448,966 | A | 9/1948 | Fales |
| 2,593,491 | A | 4/1952 | Saunders et al. |
| 3,017,769 | A | 1/1962 | Orlin |
| 3,484,953 | A | 12/1969 | Norheim, Jr. |
| 4,150,917 | A | 4/1979 | Silvestri, Jr. |
| 4,457,509 | A | 7/1984 | St-Germain |
| 4,506,849 | A | 3/1985 | Lemont |
| 4,693,175 | A | 9/1987 | Hashimoto |
| 4,818,837 | A | 4/1989 | Pfender |
| 4,836,689 | A | 6/1989 | O'Brien et al. |
| 5,297,930 | A | 3/1994 | Moore |
| 5,370,578 | A | 12/1994 | Yi |
| 5,435,127 | A | 7/1995 | Luffy et al. |
| 5,454,690 | A | 10/1995 | Wolfe et al. |
| 6,083,110 | A | * 7/2000 | Kitchen et al. ............... 73/147 |

FOREIGN PATENT DOCUMENTS

| FR | 2476761 | 2/1980 |
| FR | 2525287 | 4/1982 |
| IT | 438758 | 9/1947 |

* cited by examiner

*Primary Examiner*—William Oen
(74) *Attorney, Agent, or Firm*—Thompson Hine LLP (57) ABSTRACT

The present invention provides an apparatus for redirecting air flow, and more particularly, an apparatus for efficiently generating a vertically directed air flow having a generally uniform velocity profile from a horizontally oriented fan. In particular, the present invention provides an apparatus for redirecting a three-dimensional inwardly directed flow to a planar radially inward directed flow, as well as an apparatus for redirecting a generally horizontal planar radially inward directed flow to a vertically outward directed flow, perpendicular to the radial inward directed flow, having a relatively uniform velocity profile across the cross section of the flow.

31 Claims, 5 Drawing Sheets

METHOD AND APPARATUS FOR CREATING A WIND TUNNEL BY REDIRECTING AN AIR FLOW NINETY DEGREES

BACKGROUND OF THE INVENTION

The present invention relates to an apparatus for redirecting air flow, and more particularly, to an apparatus for efficiently redirecting a horizontal, planar, radially inward directed air flow ninety degrees to a vertically directed air flow having a generally uniform velocity profile. Additionally, the present invention provides an apparatus for directing a three-dimensional inward directed air flow to a planar radially inward directed flow as well as an apparatus for directing an air flow having a generally uniform velocity profile to the inlet of a ducted fan.

Wind tunnels can generally be open circuit designs, wherein the air is drawn from and discharged to the ambient atmosphere, or closed circuit designs, wherein the air is recycled. In the case of an open circuit design, in order to create a vertically discharged air stream, prior art wind tunnels have used a vertically oriented fan to directly accelerate air which is exhausted to an upper exit section. Wind tunnels such as these have been used for recreation, such as re-creating a free-fall environment for training sky divers, or for scientific and research purposes. When such a tunnel is used for recreational or training purposes, a user is placed directly into the accelerated air flow, which acts upon the user's body with sufficient force so as to suspend the user's body at a certain elevation. The user is thus maintained in the elevated position until the user is removed from the flow of air, or the air flow is reduced or terminated. When used for research purposes, an object to be studied is placed in the air stream so that measurements can be taken. Commonly, smoke tracers are also used so that the air flow around the object can be observed. In either usage, a relatively uniform velocity profile is highly desirable.

However, existing vertical wind tunnels as described above have several drawbacks for these usages. For example, in recreational circumstances, the user is either elevated directly over or directly beneath the fan or blower motor and is therefore subjected to noise levels loud enough that ear plugs may be required to reduce the sound to a tolerable level. Furthermore, the air flow emanating from the fan is generally quite turbulent and has an uneven velocity profile, which leads to rough conditions for the user and unpredictable variables for the researcher. These problems are increased by the fact that most vertical wind tunnels of this type utilize a standard aircraft propeller to accelerate the air which further contributes to the heightened noise levels and the uneven velocity profiles.

Additionally, the positioning of the fan motor in a vertically upright orientation presents its own set of engineering obstacles. First, in order to create the desired laminar flow, the length of the entire assembly from the fan drive motor to the upper exit section can be quite long. Therefore, in order to house the necessary equipment and place the upper exit section of the wind tunnel at an easily accessible location, either significant excavation or construction of an elevation structure must be completed which can greatly increase the expense and complexity of the wind tunnel construction. Furthermore, additional ductwork has to be built to provide inlet air for the fan, further adding to construction expense. Even more significantly, though, is the fact that the vertical orientation of the fan motor places more stress on the motor bearings than a horizontal orientation would, thereby increasing maintenance expense and reducing the life span of the motor.

In order to overcome these problems, wind tunnels have been built to create vertical air flows using generally horizontally oriented fans. For example, prior art wind tunnels have been made for creating a vertical air flow using horizontal fans whereby the horizontal fan accelerates air through a run of horizontal ductwork after which the air is turned to a vertical direction using a vertically angled baffle. However, prior art apparatuses using this method have encountered problems. For instance, the velocity profile of the air flow leaving the tunnel is not as uniform or consistent as is generally required or desired. Furthermore, the baffles used for redirecting the flow is very inefficient, resulting in unacceptable energy losses, and therefore lower than desired air flow velocities.

Accordingly, there is a need for an apparatus for creating a vertical flow of air which provides relatively uniform flow velocities, which is relatively quiet in operation, which is of simple design and construction, and which can be assembled and maintained at a low cost. Accordingly, there also exists a need for an apparatus which can efficiently redirect air flow from a generally horizontal direction to a generally vertical direction. There also exists a need for an apparatus which can redirect a three-dimensional, inward directed air flow to a generally planar radially-inward directed flow. Furthermore, there exists a need for an apparatus that can redirect air flow in the above-noted manners in an efficient manner while maintaining relatively high energy ratios.

SUMMARY OF THE INVENTION

It is an object of the present invention to provide an apparatus for redirecting air flow from a generally horizontal flow to a generally vertical flow in an efficient manner. The present invention also efficiently redirects a three-dimensional, inward directed air flow to a generally planar radially-inward directed flow.

The apparatus of the present invention redirects air flow from a generally horizontally-directed flow to a generally vertically-directed flow by first creating a three-dimensional horizontally directed air flow from a horizontally mounted ducted fan. This three-dimensional flow is then directed into the bottom of a vertically oriented nozzle in a radially inward manner. Finally, the radially inward directed flow is converted to a vertically outward directed flow, and is forced out through the nozzle. The redirection of the flow from a radial inward to a vertically outward direction is accomplished by means of a stagnation zone formed in the nozzle by the impingement of all of the inward flows upon each other. The redirection from a three-dimensional inward flow to a generally planar, radially inward flow is accomplished by a scroll.

While the scroll can be of any shape which is capable of converting the three-dimensional flow to a generally planar, radially inward flow, preferably it is in the shape of two symmetric chambers or a spiral, or more preferably, a hyperbolic spiral. If the symmetric chambers are used, the horizontally directed three-dimensional flow is split before reaching the nozzle and directed so that each chamber receives roughly one-half of the flow. Each chamber then operates to efficiently distribute the air radially inward on a plane to the center point of the nozzle, which is distributed evenly above both chambers.

Alternatively, if a hyperbolic spiral is used, the horizontally directed three-dimensional flow is diverted around the circumference of the nozzle such that the air is proportionally distributed on a plane into the nozzle until the flow is substantially dissipated, any remaining air being directed to rejoin the incoming flow. In either case, the flow enters the bottom of the nozzle on a generally horizontal plane and is directed radially inward as it enters the nozzle by a series of shaped guide vanes.

Upon approaching the center point of the nozzle, a stagnation zone is formed as the individual radially inward directed flows impinge upon each other. This stagnation zone has a high degree of static pressure and takes the form of an upwardly protruding cone which operates to smoothly and efficiently direct the air upwards through the opening in the nozzle. Thus the flow exiting the nozzle is efficiently redirected in a vertical direction and has a generally uniform velocity profile.

The use of nozzles for directing fluid flow is well known in the art. In particular, it is known to use a converging nozzle in an internal combustion engine to direct air into the carburetor. However, in most prior art applications using nozzles, the inlet to the nozzle is connected to a relatively large plenum. In these applications it is considered highly desirable to keep obstructions away from the nozzle inlet so that the fluid flows into the nozzle in an undisturbed, laminar flow. Accordingly, designers of these prior art systems would not think to position a nozzle as it is positioned in the present invention, namely with the inlet in close proximity to a flat, solid surface. In fact, this convention would be the antithesis of what would generally be considered a desirable design feature. Additionally, it is noted that while guide vanes are taught in prior art closed-circuit wind tunnel designs for directing air flows around the corners of the closed-circuit tunnels, it is believed that the use of guide vanes as disclosed in the present invention to create radially inward flows which impinge upon each other to create a stagnation zone is heretofore unknown.

The present invention further provides a wind tunnel having a horizontal lead-in with an exit which is normal to the lead-in. This arrangement allows the motor and fan to be remotely placed from the user, and provides a much quieter environment than is provided in prior art vertical configurations. Furthermore, the horizontal section also allows for greater control over the air flow. Thus a generally even, uniform flow may be generated. Also, the horizontal lead-in section of the present invention avoids the problems associated with the extensive excavation required for the entirely vertically oriented tunnels of the prior art.

Additionally, the present invention allows the use of a ducted fan in place of fans with standard propellers, as used in the prior art. Ducted fans are desirable because the geometry around the ducted fan, including the fan inlet ducts, may be more easily controlled as well as the fact that ducted fans are quieter and more efficient than standard propellers. Therefore, by using an inlet bell having an appropriate shape, the flow into the fan can be manipulated to produce a flow coming out of the fan having the desired, more uniform, velocity profile. Accordingly, it is an additional objective of this invention to provide an inlet bell having a structure similar to the outlet nozzle of the present invention which utilizes a stagnation zone to redirect air efficiently into the inlet of a ducted fan.

Accordingly, the present invention provides for an apparatus for redirecting airflow from a generally three-dimensional, inward directed flow to a generally planar, radially inward directed flow, and then to a vertically outward flow having a uniform velocity profile. The apparatus comprises a generally planar support surface and a converging nozzle arranged such that the nozzle axis is generally perpendicular to the support surface. The nozzle is spaced apart from the support surface to create a nozzle opening to receive the radially-inward directed air flow. The nozzle has a curvature, preferably ellipsoid in shape, selected such that a three-dimensional pressure distribution or stagnation zone is created in the lower portion of the nozzle when air flows radially inwards through the nozzle opening, thereby aiding in the redirection of the air vertically outward.

These and other objects and advantages of the present invention will be more fully understood and appreciated by reference to the following description, the accompanying drawings and the appended claims.

DETAILED DESCRIPTION

FIGS. 1–5 illustrate preferred embodiments of the apparatus of the present invention, generally designated 10. As shown best in FIGS. 1 and 2, the apparatus 10 includes an inner chamber 15 defined by an outer housing 17. The apparatus 10 further includes a motor 12 having a horizontally-oriented output shaft 14. The output shaft 14 powers the fan 16 having a series of blades 18. The rotating blades 18 accelerate incoming air (shown by A arrows in FIG. 2) in the downstream direction (shown by B arrows in FIGS. 1 and 2). A plurality of stationary, radially spaced straightening vanes 20 are positioned downstream of the fan 16 and serve to straighten the air flow that is propelled from the blades 18, and tend to remove rotational components in the air flow that are imparted by the blades 18. The straightening vanes 20 are preferably spaced evenly around the circumference of the blades 18.

Figure 2:
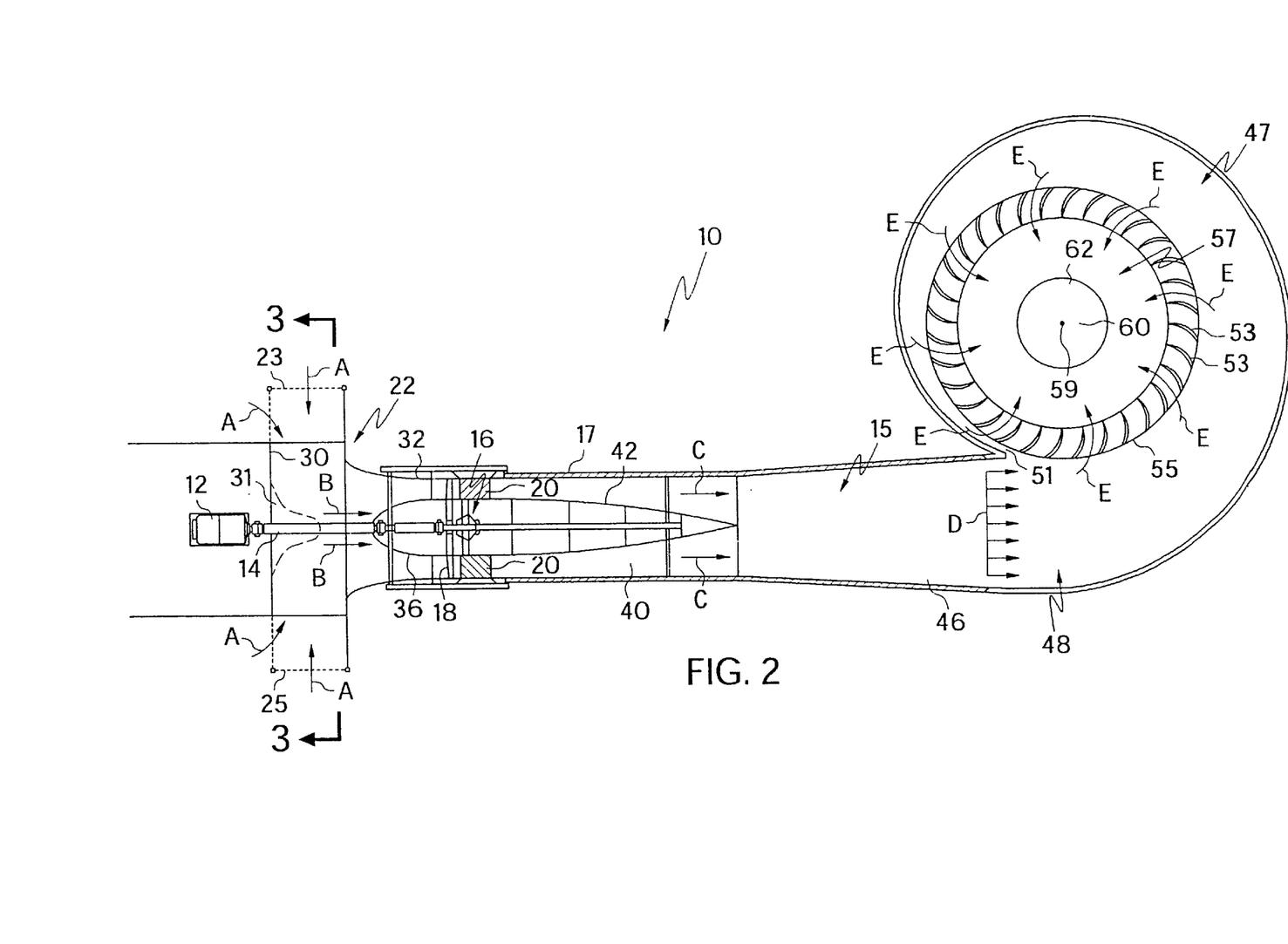
FIG. 2 is a top plan view of the apparatus of FIG. 1.
Figure 5:
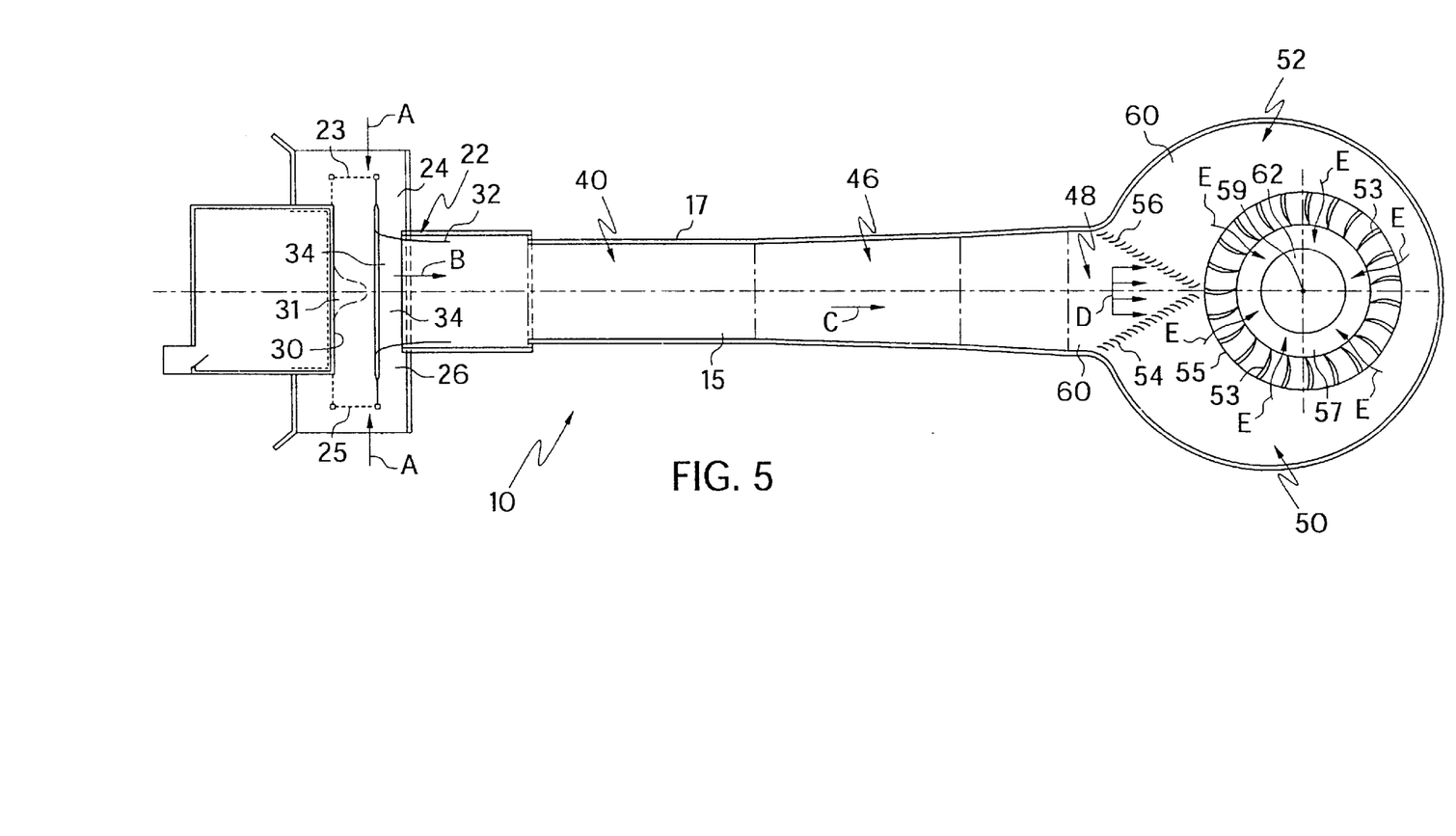
FIG. 5 is a top plan view of an apparatus of the present invention incorporating a scroll in the shape of two symmetric chambers.

As shown in FIGS. 2 and 5, air enters into the apparatus 10 (shown by A arrows) by means of the inlet assembly, generally designated 22. The inlet assembly 22 is generally elliptical in shape and includes two inlet chambers 24, 26 which are open to the ambient air. Air enters the apparatus 10 by means of these chambers 24, 26. Each chamber 24, 26 preferably has a filter 23, 25 to remove foreign particles from the air. The filters 23, 25 may be manufactured of a steel lattice having steel filter material interspersed therein, thereby preventing foreign objects from being drawn into the apparatus 10 by the rotating fan blades 18. As air enters into the inlet nozzle 22, it is guided radially inwardly by a pair of guide surfaces 41, 43, as shown best in FIG. 3.

Figure 3:
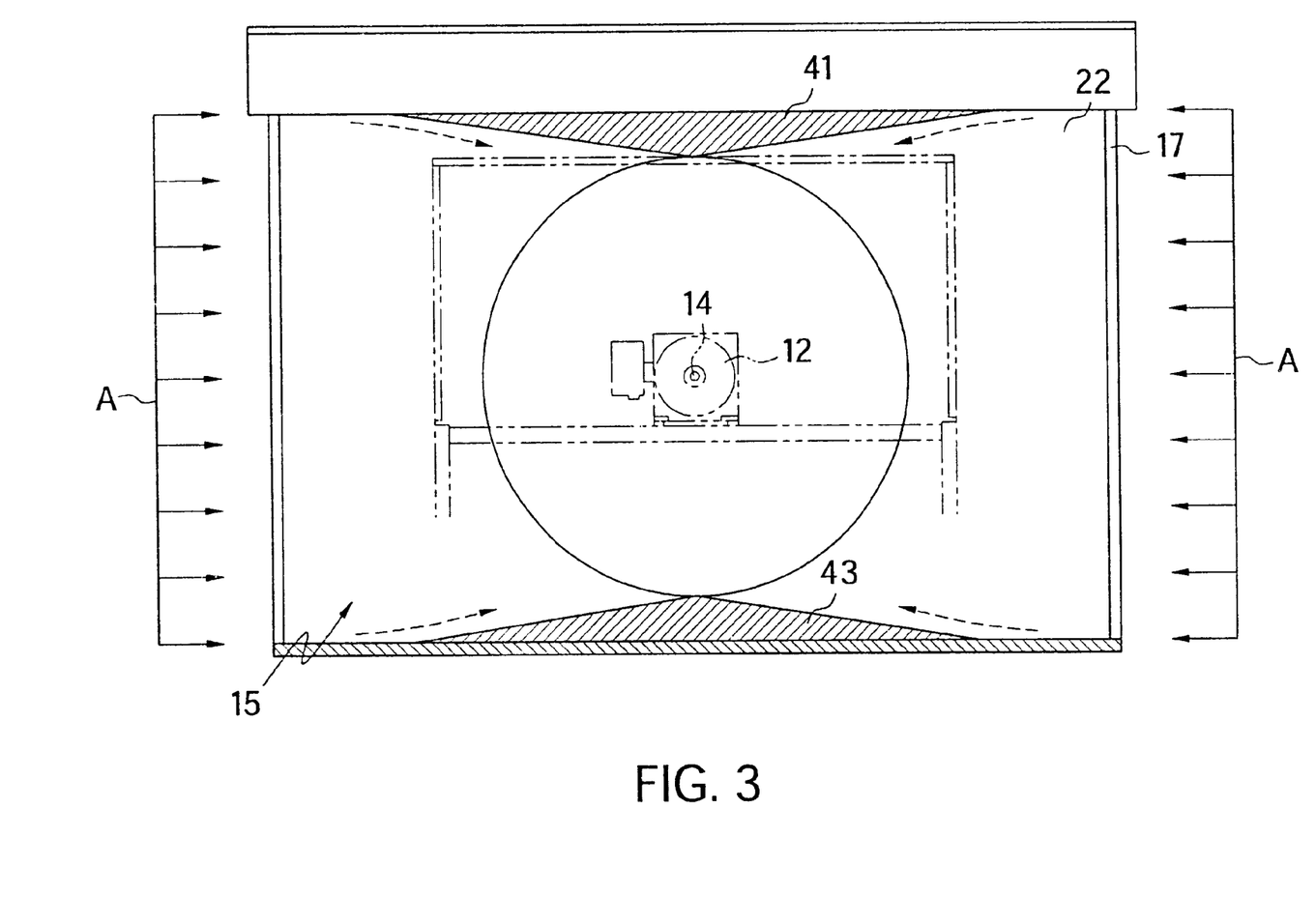
FIG. 3 is a side elevational view of a cross section of the horizontal air accelerating section of the apparatus taken along the line A—A of FIG. 2.

Preferably, the inlet assembly 22 further includes a vertical wall 30 and a converging inlet nozzle 32. The axis of the inlet nozzle 32 is generally perpendicular to the surface of the walls 30. Accordingly, when the fan motor 12 is operated, thus rotating the fan blades 18, a three-dimensional pressure distribution 31 is created along the wall 30 by the impingement of the air flows A against each other. This pressure distribution, or stagnation zone, 31 is centered on a portion of the wall 30 corresponding with the axis of the converging nozzle 32 and motor output shaft 14. The inlet chambers 24, 26, wall 30 and converging nozzle 32 operate so as to create this pressure distribution 31 on the center of the wall 30 when the fan blades 18 are rotating. The pressure distribution 31 thus created aids in redirecting the air flow from a horizontal, generally radially inward directed flow, shown by A arrows, to a generally three-dimensional horizontally directed output flow, shown by B arrows, that is parallel to the output shaft 14.

Figure 1:
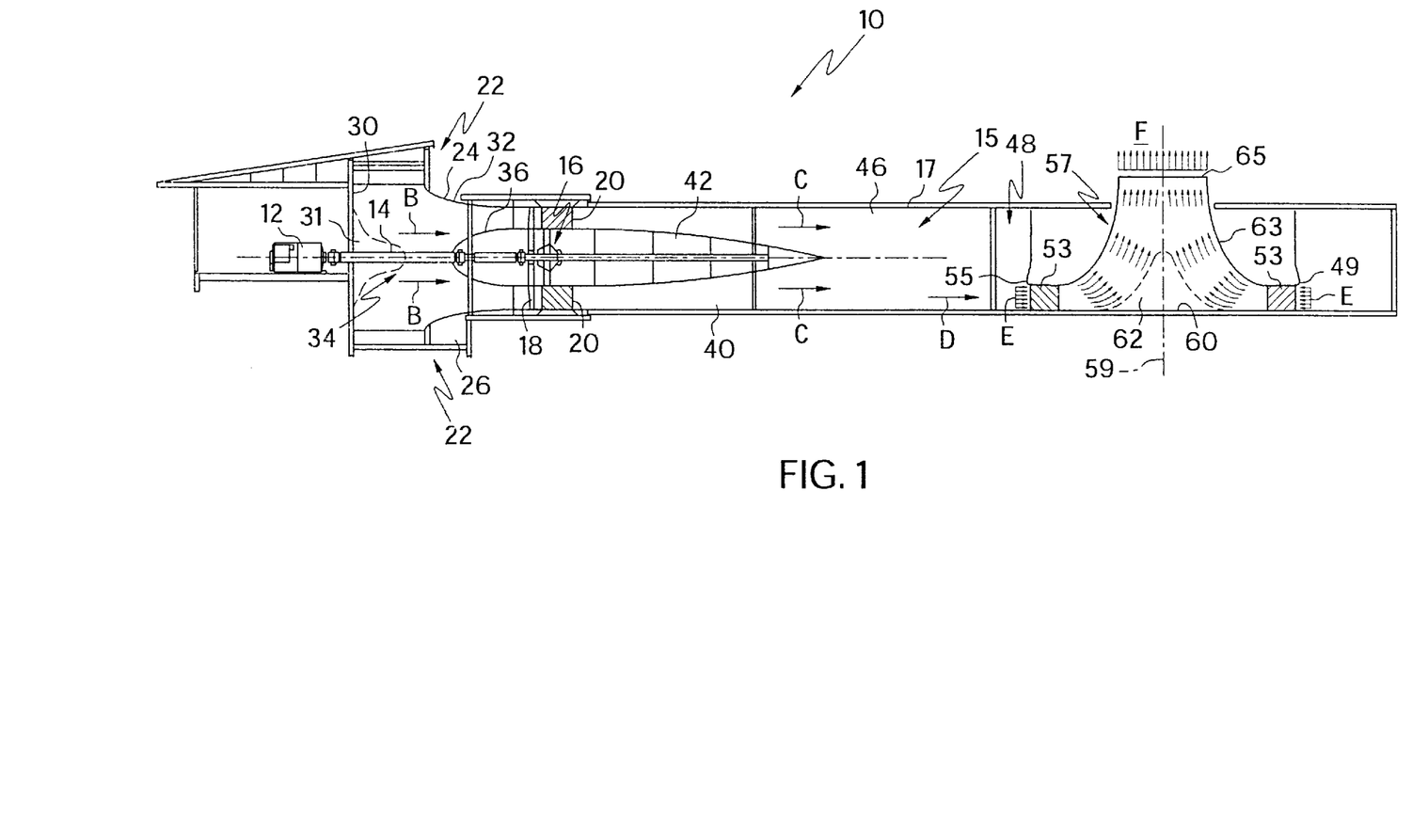
FIG. 1 is a side elevational view of an apparatus of the present invention incorporating a scroll in the shape of a hyperbolic spiral.

As best shown in FIGS. 1 and 5, when the air exits the inlet nozzle 32 in the horizontal direction as described above, it encounters a boss 36. The boss 36 provides a converging section in which the air accelerates and moves radially outward, guiding the air towards the fan blades 18. The air flow is then propelled by the rotating fan blades 18 into the straightening vanes 20, after which it enters the fan diffuser section 40. The boss 36 continues into the diffuser section 40 and tapers inward to form a nacelle 42. The taper of the nacelle 42 is shaped to decrease the amount of turbulence created by air flowing off the surface of the nacelle 42. The gradual decrease in radius of the nacelle 42 in the downstream direction increases the cross-sectional area of the diffuser section 40 and inner chamber 15, thereby decelerating the air flow (shown by C arrows) in a controlled manner. Of course, the decrease in velocity of the air flow is accompanied by a corresponding increase in static energy which is important because the air flow velocity must be decreased in order to make it possible to turn the air in an efficient manner.

Once the air flow exits the diffuser section 40, it enters the transition diffuser 46. The transition diffuser 46 continues to increase the cross-sectional area of the inner chamber 15 while transforming the geometry of the inner chamber 15 from the cylindrical geometry dictated by the fan 16 to a preferred rectangular geometry. The transition diffuser 46 further decelerates the air flow and increases its static energy before the air flow is directed into the scroll 48.

Depending on whether or not the scroll 48 is shaped as a pair of symmetric chambers (as shown in FIG. 5) or a hyperbolic spiral (as shown in FIG. 2) in order to evenly distribute the air flow around the periphery 55 of the converging exit nozzle 57, the path of the air is affected as follows.

In the case of the symmetric chambers (see FIG. 5), the air exiting the transition diffuser 46, shown by D arrows, is generally split into two air flows: roughly half the air enters the first chamber 50, and the remaining half enters the second chamber 52. Each chamber is shaped so that the cross-sectional area of the chamber decreases as the air flow continues in the downstream direction, thereby aiding in the distribution of the air flow relatively evenly around the periphery 55 of the nozzle 57. The entry of the air into the chambers 50, 52 is guided by a plurality of turning vanes 54, 56. The turning vanes 54, 56 are preferably curved pieces of sheet metal and are generally identical in shape. Thus, upon being split and turned into the chambers 50, 52, the air flow is guided in a direction around the outer walls of the chambers 50, 52 and towards the periphery 55 of the nozzle 57. The nozzle 57 is positioned so that it is suspended above the floor 60 of the scroll 48, thereby allowing the air flow around the periphery 55 of the nozzle 57 to enter underneath the bottom surface 49 of the nozzle 57 toward the central axis 59 of the nozzle 57 (shown by E arrows).

Similarly, in the case of the preferred hyperbolic spiral shape 47 (see FIG. 2), the air flow is directed around the outer wall of the spiral 47 which curls around the central axis 59 of the nozzle 57. Since the cross-sectional area of the spiral 47 decreases proportionally with the radial movement around the outer periphery 55 of the nozzle 57, the air flow is proportionally and evenly directed under the bottom surface 49 of the nozzle 57 towards the central axis 59 of the nozzle 57. The remaining air, if any, on the completion of the air flow around the spiral 47 is directed to rejoin the incoming air flow into the scroll 48 at re-entry point 51. This hyperbolic spiral shape 47 for the scroll 48 is preferred because energy losses and air flow disturbances are less than those encountered using the above-mentioned symmetric chambers 50, 52.

However, whichever scroll shape is used, as air circulates around the periphery 55 of the nozzle 57, the bottom-most portions of the flow immediately enter into the nozzle 57 under the nozzle's 57 bottom surface 49. The upper portions of the air flow in the scroll 48 then drop down to replace the departed air flow. The flow of the air into the nozzle 57 (shown by E arrows) is aided by a plurality of nozzle guide vanes 53. The nozzle guide vanes 53 are shaped so as to direct the air flow into the nozzle 57 on a generally radially inward path towards the central axis 59 of the nozzle 57.

Figure 4:
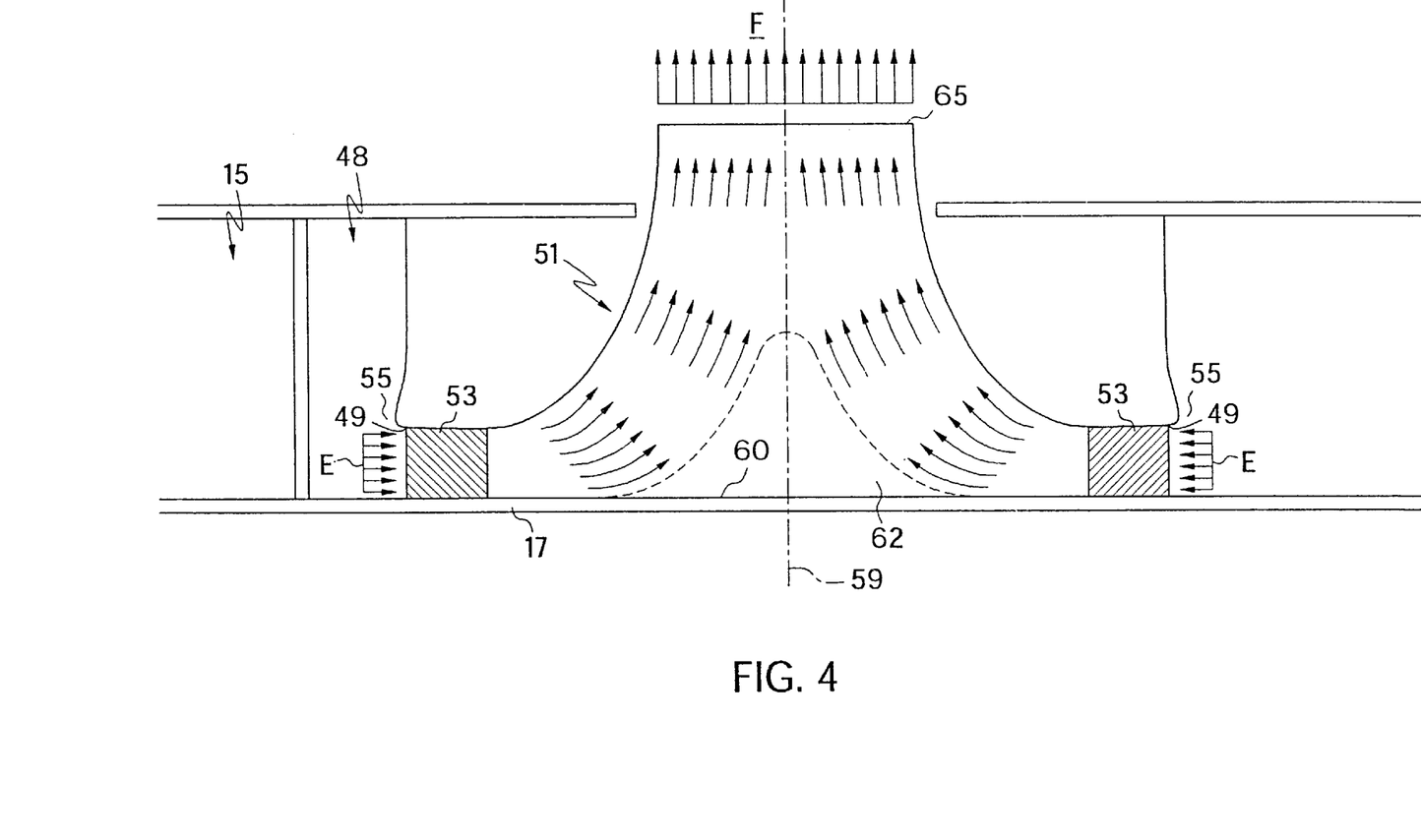
FIG. 4 is a side elevational view of the nozzle portion of the present invention as shown in FIG.1.

As the radially inward directed air enters the nozzle 57 (shown by E arrows), the individual air flows impinge upon each other to form a generally conically shaped stagnation zone 62, which extends upwards from the floor 60 of the scroll, approximately at the central axis 59 of the nozzle 57 as best seen in FIG. 4, the stagnation zone 62 is responsible for redirecting air from a generally radially inward path to an axial flow, perpendicular to the floor 60 of the scroll 48. The curvature of the nozzle 57 is selected so as to create the appropriate stagnation zone 60 in the lower portion of the nozzle 57. Once the air is redirected by the geometry of the floor 60, nozzle 57 and the stagnation zone 62, the air is accelerated vertically and exits the top 65 of the nozzle 57 (shown by F arrows). Preferably, the air exiting the nozzle 57 has a fairly uniform velocity profile with very little loss of velocity near the edges of the air flow. Most preferably, the air flow is controlled, less turbulent and is created more efficiently than in prior art vertically discharging wind tunnels.

While the forms of the apparatus herein described constitute a preferred embodiment of the invention, it is to be understood that the present invention is not limited to these precise forms and that changes may be made therein without departing from the scope of the invention.

What is claimed is:

1. An apparatus for redirecting air flow ninety degrees comprising:

a generally planar support surface; and a converging nozzle having an inlet, an outlet, and a central axis, said nozzle inlet being spaced from said support surface and positioned such that said central axis of said nozzle is generally perpendicular to said support surface, and wherein said nozzle is shaped such that air flowing along said support surface radially inwardly towards said central axis creates a conically shaped zone of stagnate air around said central axis, said zone of stagnate air thereby redirecting said radially inwardly directed air into said nozzle inlet, through said nozzle, and outward through said nozzle, wherein said air flow leaving said nozzle outlet has a relatively uniform velocity profile.

2. The apparatus of claim 1 further comprising a plurality of guide vanes positioned on said support surface beneath said inlet to guide said air flow along said support surface in a generally radially inwards direction towards said nozzle central axis.

3. The apparatus of claim 2 further comprising a scroll enclosing said guide vanes and said inlet, wherein said scroll is shaped to distribute said air flow evenly towards said nozzle central axis.

4. The apparatus of claim 3 wherein said nozzle inlet is circular in shape, has an outer circumference, and the center point of said nozzle inlet is coaxial with said nozzle central axis.

5. The apparatus of claim 4 wherein said scroll is shaped as a hyperbolic spiral.

6. The apparatus of claim 5 wherein said hyperbolic spiral shaped scroll includes an outer wall positioned around said nozzle inlet outer circumference such that the cross-sectional area between said outer wall and said nozzle inlet outer circumference decreases in proportion to the degree of angular rotation about said nozzle central axis so that said air flow along said support surface is distributed evenly towards said nozzle central axis.

7. The apparatus of claim 6 further including a lead-in section which is co-planar with said support surface for directing said air flow to said scroll.

8. The apparatus of claim 7 wherein the pressure distribution pattern in said zone of stagnate air is approximately centered on said central axis of said nozzle and the static pressure of said air increases as the radial center of said zone is approached.

9. The apparatus of claim 3 wherein said scroll is composed of two symmetric chambers, each of said chambers including an inlet, an outer wall, and a plurality of turning vanes positioned near said inlet so that when said air flow impinges upon said turning vanes approximately half of said air flow is directed to one chamber and the other half of said air flow is directed to the other chamber.

10. The apparatus of claim 9 further including a lead-in section which is co-planar with said support surface for directing an air flow to said scroll.

11. The apparatus of claim 10 wherein said air flow flows into said chambers from said lead-in section and the cross-sectional area of said chambers decreases downstream of said air flow, thereby facilitating an even distribution of said air flow into said nozzle inlet.

12. The apparatus of claim 7 further including a ducted fan for accelerating air to create said air flow, said fan further including an inlet and an outlet.

13. The apparatus of claim 12 wherein said ducted fan is located in a fan section connected to said lead-in section.

14. The apparatus of claim 13 further including a diffuser section located between said fan section and said lead-in section shaped to decrease the velocity of said air flow created by said ducted fan.

15. The apparatus of claim 14 further including a set of straightening vanes arranged about said fan section for straightening said air flow created by said ducted fan.

16. The apparatus of claim 15 wherein said straightening vanes are evenly circumferentially spaced about said fan section.

17. The apparatus of claim 16 further including an inlet nozzle positioned prior to said fan inlet located for directing air to said fan inlet.

18. The apparatus of claim 17 wherein said inlet nozzle includes an inlet nozzle having upper and lower guide surfaces located in said inlet nozzle to guide air entering said inlet nozzle in a generally radially inward direction to said fan inlet.

19. An apparatus for redirecting air flow ninety degrees comprising:

a generally planar support surface;

a converging nozzle having an inlet, an outlet, and a central axis, said nozzle inlet being spaced from said support surface and positioned such that said central axis of said nozzle is generally perpendicular to said support surface, and wherein said nozzle is shaped such that air flowing along said support surface radially inwardly towards said central axis creates a conically shaped zone of stagnate air around said central axis wherein the pressure distribution pattern in said zone of stagnate air is approximately centered on said central axis of said nozzle and the static pressure of said air increases as the radial center of said zone is approached, said zone of stagnate air thereby redirecting said radially inwardly directed air into said nozzle inlet, through said nozzle, and outward through said nozzle outlet;

a scroll enclosing said converging nozzle inlet, wherein said scroll is shaped to distribute said air flow evenly towards said nozzle central axis;

a lead-in section which is co-planar with said support surface for directing said air flow to said scroll;

a ducted fan located in a fan section connected to said lead-in section for accelerating air to create said air flow, said fan further including an inlet and an outlet;

a diffuser section located between said fan section and said lead-in section shaped to decrease the velocity of said air flow created by said ducted fan; and an inlet nozzle positioned prior to said fan inlet for directing air into said fan inlet.

20. The apparatus of claim 19 further comprising a plurality of guide vanes positioned on said support surface beneath said inlet to guide said air flow along said support surface in a generally radially inwards direction towards said nozzle central axis.

21. The apparatus of claim 20 wherein said nozzle inlet is circular in shape, has an outer circumference, and the center point of said nozzle inlet is coaxial with said nozzle central axis.

22. The apparatus of claim 21 wherein said scroll is shaped as a hyperbolic spiral.

23. The apparatus of claim 22 wherein said hyperbolic spiral shaped scroll includes an outer wall positioned around said nozzle inlet outer circumference such that the cross-sectional area between said outer wall and said nozzle inlet outer circumference decreases in proportion to the degree of angular rotation about said nozzle central axis so that said air flow along said support surface is distributed evenly towards said nozzle central axis.

24. The apparatus of claim 19 wherein said scroll is composed of two symmetric chambers, each of said chambers including an inlet, an outer wall, and a plurality of turning vanes positioned near said inlet so that when said air flow impinges upon said turning vanes approximately half of said air flow is directed to one chamber and the other half of said air flow is directed to the other chamber.

25. The apparatus of claim 24 wherein said air flow flows into said chambers from said lead-in section and the cross-sectional area of said chambers decreases downstream of said air flow, thereby facilitating an even distribution of said air flow into said nozzle inlet.

26. The apparatus of claim 19 further including a set of straightening vanes arranged about said fan section for straightening said air flow created by said ducted fan.

27. The apparatus of claim 26 wherein said straightening vanes are evenly circumferentially spaced about said fan section.

28. The apparatus of claim 27 wherein said inlet nozzle includes an inlet nozzle having upper and lower guide surfaces to guide air entering said inlet nozzle in a generally radially inward direction into said fan inlet.

29. The apparatus of claim 3 further comprising at least one planar surface positioned on said planar support surface proximal said central axis to decrease rotational movement of said air flow flowing out of said nozzle.

30. The apparatus of claim 29 wherein said planar surface is triangular in shape.

31. The apparatus of claim 3 further comprising two triangular shaped planar surfaces which intersect and are attached in an X configuration, said planar surfaces positioned on said planar support surface proximal said central axis to decrease rotational movement of said air flow flowing out of said nozzle.

\* \* \* \* \*